June 13, 1939.  F. L. MAIN  2,161,899

BRAKE MECHANISM

Filed June 29, 1936  2 Sheets-Sheet 1

*INVENTOR*
FRANK L. MAIN
BY *Whittemore Hulbert & Belknap*
*ATTORNEYS*

June 13, 1939.　　　F. L. MAIN　　　2,161,899
BRAKE MECHANISM
Filed June 29, 1936　　　2 Sheets-Sheet 2
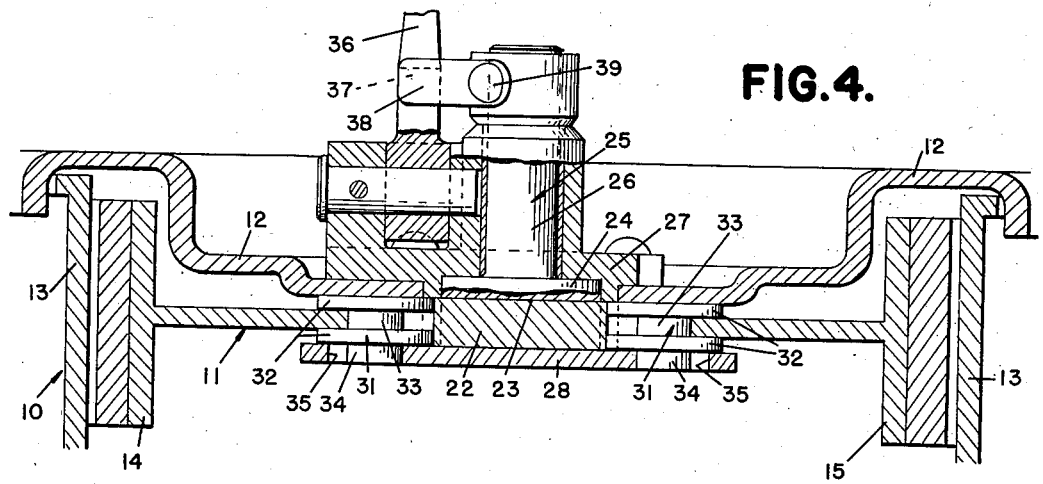
FIG. 4.
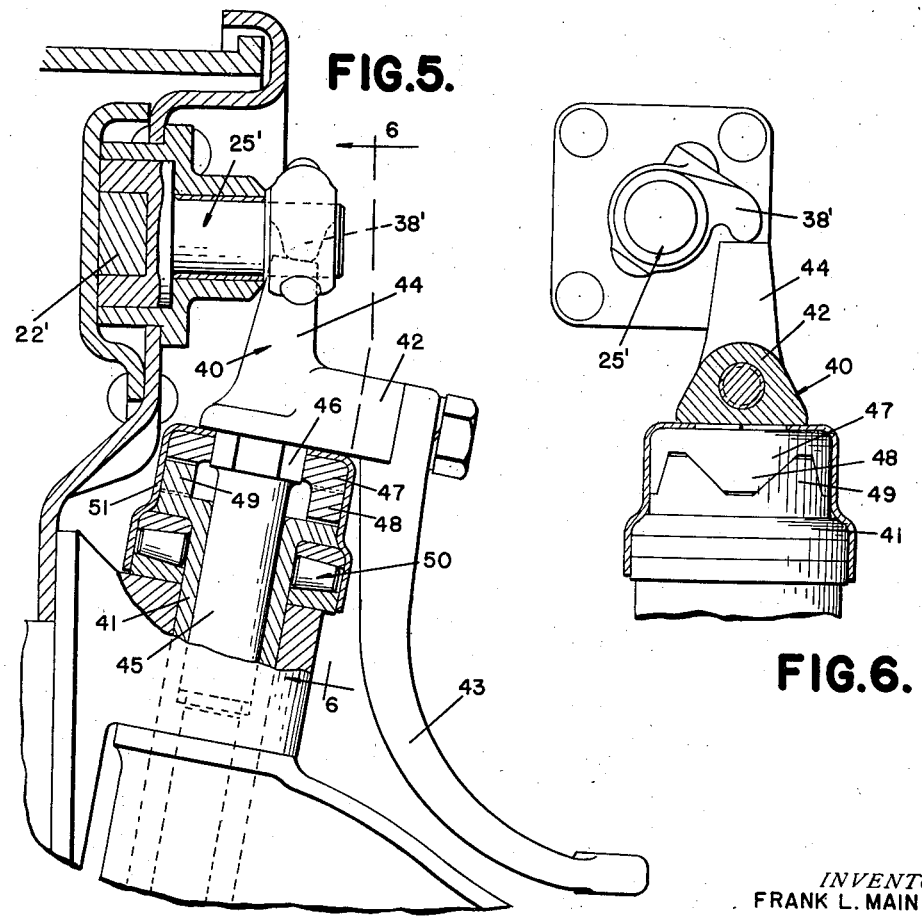
FIG. 5.
FIG. 6.
*INVENTOR*
FRANK L. MAIN
*ATTORNEYS*

Patented June 13, 1939

2,161,899

UNITED STATES PATENT OFFICE 2,161,899

BRAKE MECHANISM

Frank L. Main, Birmingham, Mich., assignor to Kelsey-Hayes Wheel Company, Detroit, Mich., a corporation of Delaware Application June 29, 1936, Serial No. 88,003

9 Claims. (Cl. 188—78)

This invention relates generally to brake mechanisms and refers more particularly to an improved actuator for the brake friction means.

One of the principal objects of the present invention is to appreciably increase braking efficiency by providing an actuator for the brake friction means operable to more effectively engage the brake friction means throughout the extent thereof with the brake flange of the drum. In the present instance, the above is accomplished by locating a rockable cam between adjacent ends of the friction means in such a manner that rocking movement of the cam in one direction effects a movement of the actuator end of the primary shoe outwardly into frictional engagement with the brake flange of the drum and simultaneously lifts the anchor end of the secondary shoe into engagement with the brake flange causing the secondary shoe to wrap into engagement with the flange in the direction of rotation of the brake drum. This is desirable in that it appreciably increases the braking efficiency of the secondary shoe.

Another advantageous feature of this invention which contributes materially in obtaining a more effective brake resides in the provision of rollers operatively connecting the actuating cam to the shoe ends in such a manner that the wiping action of the cam on the rollers is converted by the latter into linear movement of the actuator ends of the shoes with the minimum of frictional resistance.

Still another advantageous feature of this invention resides in the provision of a construction of the character set forth wherein the actuator ends of the shoes are provided with arcuate recesses having a radius corresponding to the radius of the rollers and engageable therewith. This construction is advantageous in that it affords a relatively large area of rolling contact of the actuator ends of the shoes with the rollers and thus prevents upsetting of the shoe ends.

A further object of this invention consists in the provision of brake mechanism wherein the actuator ends of the shoes are positively positioned when the brake is released to permit accurate adjustment of the shoes.

A further advantageous feature of the present invention resides in the novel means provided herein for rocking the cam to expand the brake shoes into engagement with the brake flange of the drum. This feature, as well as the foregoing and other objects, will be made more apparent as this description proceeds, especially when considered in connection with the accompanying drawings, wherein:

Figure 4 is a sectional view taken substantially on the plane indicated by the line 4—4 of Figure 1;

Figure 5 is a fragmentary sectional view illustrating a slightly modified form of construction; and Figure 6 is a sectional view taken substantially on the plane indicated by the line 6—6 of Figure 5.

For the purpose of illustrating the present invention, I have shown my improved actuators in association with brakes of the two-shoe type, although it will be understood, as this description proceeds, that the actuators are applicable to brakes embodying other types of friction means.

Figure 1:
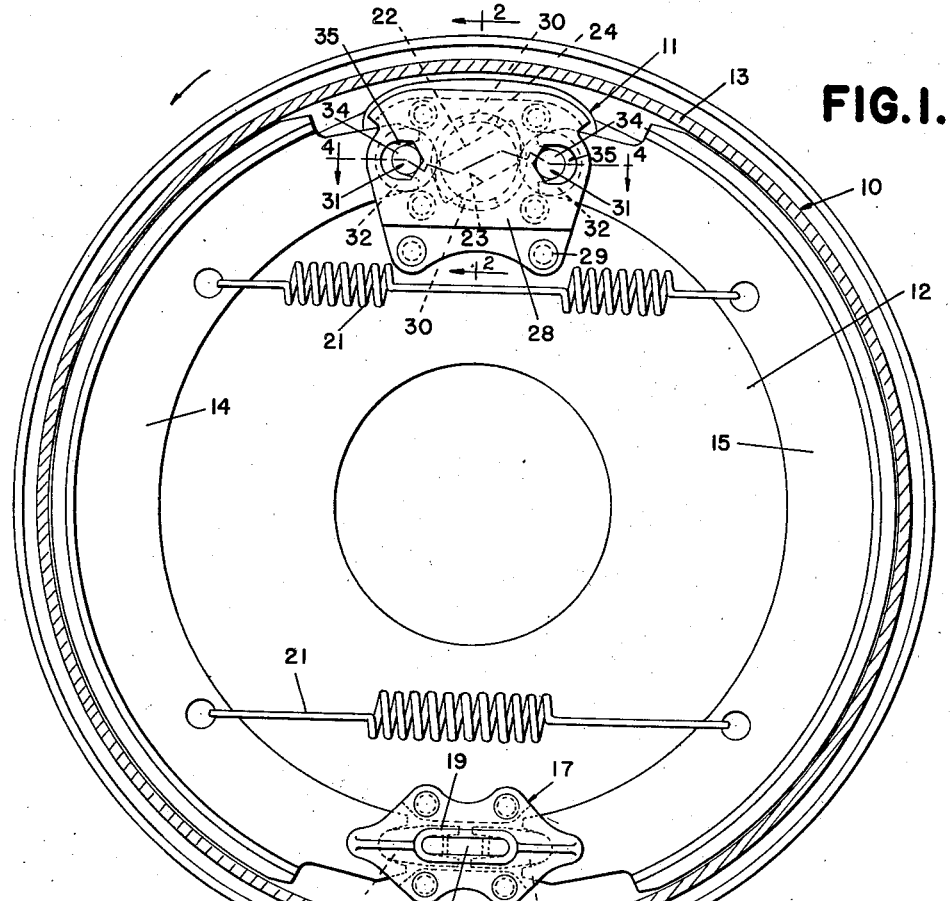
Figure 1 is a side elevational view of a brake drum equipped with brake mechanism constructed in accordance with this invention.

Upon reference to Figure 1, it will be noted that the brake illustrated herein comprises a brake drum 10 and brake mechanism 11 supported within the drum on a backing plate 12 constructed to close the rear side of the drum. In accordance with conventional practice, the brake friction means of the mechanism 11 is located in the drum for engagement with the inner annular surface of the brake flange 13 on the drum, and in the present instance, comprises two shoes 14 and 15. Assuming that the drum is rotated in the direction of the arrow in Figure 1, the shoe 14 is of the primary or leading shoe, and the shoe 15 is the trailing or secondary shoe. Both of these shoes are T-shaped in cross section, and the opposite ends thereof are spaced from each other circumferentially of the drum.

Secured to the backing plate 12 of the brake drum between the lower ends of the two shoes, is an adjustment anchor device 17 operable to compensate for wear of the friction surfaces of the shoes by varying the clearance between the latter surfaces and the brake flange 13 of the drum. Insofar as the present invention is concerned, the adjustment anchor device may be of any construction capable of effecting the foregoing results. However, for the purpose of illustration, the device 17 comprises a wedge 18 adjustable axially of the drum within a bracket 19 secured to the backing plate 12 and cooperating with the backing plate to form a guide for the adjustment links 20. The inner ends of the adjustment links engage the inclined opposite sides of the wedge 18, while the outer ends of the links respectively engage the lower ends of the shoes and form fulcrums about which the shoes are moved into engagement with the brake flange 13 of the drum by the actuator.

Figure 2:
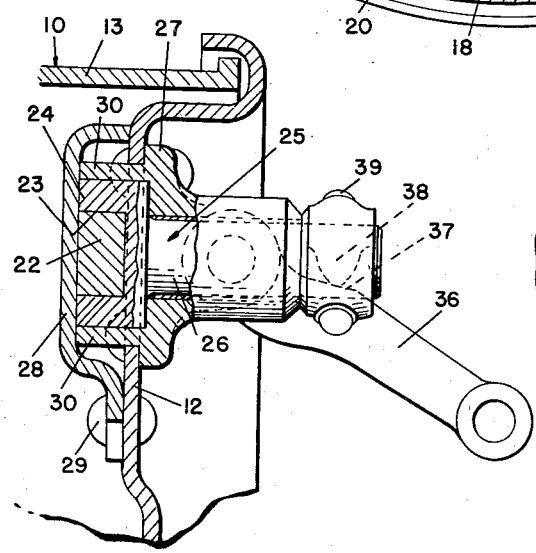
Figure 2 is a sectional view taken substantially on the plane indicated by the line 2—2 of Figure 1.
Figure 3:
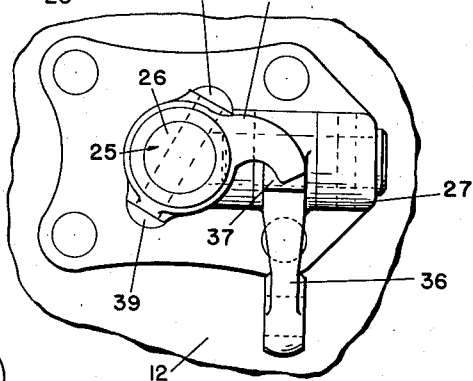
Figure 3 is a fragmentary side elevational view of the construction shown in Figure 2.

The actuating means for moving the shoes outwardly into engagement with the brake flange 13 against the action of the usual retraction springs 21, is located between the upper ends of the brake shoes and comprises a cam 22 supported on the backing plate 12 for rocking movement on an axis substantially parallel to the axis of the drum. Upon reference to Figures 1 and 2, it will be noted that the cam 22 extends transversely to the axis of rocking movement thereof and is positioned between the upper ends of the brake shoes in a recess 23 formed in the front side of a head 24 on the rockshaft 25. The backing plate 12 is apertured to provide for extending the head 24 of the rockshaft, therethrough, into the brake drum, and the reduced portion 26 of the rockshaft is journalled in a bracket 27 for rocking movement about an axis parallel to the axis of the brake drum. The bracket 27 is provided with laterally extending ears at the forward end thereof abutting the rear side of the backing plate and is riveted, or otherwise suitably secured to the backing plate 12. Upon reference to Figure 2, it will be noted that the cross sectional area of the cam 22 is substantially the same as the cross sectional area of the recess 23 in the head 24 on the rockshaft 25, and is held in this recess by means of a plate 28 secured to the front side of the backing plate 12 by the rivets 29. The forwardly offset portion of the plate 28 extends across the recess 23 in engagement with the front surfaces of the head 24 and cam 22, with the result that this plate not only retains the cam in the recess, but also cooperates with the bracket 27 in preventing axial displacement of the rockshaft 25.

The opposite ends of the cam 22 extend beyond the periphery of the head 24 on the rockshaft 25, and the extent of rocking movement of the cam is limited by diametrically opposed projections 30 extending axially from the bracket 27 through the opening in the backing plate 12. It will be noted from Figure 2 that the projections engage the head 24 between the ends of the cam and thereby form a support for the head 24.

Referring now to Figure 4 of the drawings, it will be noted that the opposite ends of the cam 22 respectively engage the upper extremities of the brake shoes through the medium of rollers 31 disposed between the backing plate 12 and the retaining plate 28. The rollers 31 are provided with axially spaced enlarged flanges 32 engageable with the ends of the cam 22 and adapted to receive therebetween the upper extremities of the brake shoes to prevent axial shifting movement of the upper ends of the shoes with respect to the brake flange 13. It will be noted from Figure 1 that the upper extremities of the brake shoes are recessed to receive the reduced portions 33 of the rollers between the flanges 32, and that the recessed portions of the shoes are maintained into engagement with the reduced portions 33 of the rollers by the retraction springs 21. The rollers 31 are, in turn, retained in assembled relationship between the backing plate 12 and retaining plate 28 by extending the reduced portions 34, at the front side of the rollers, through elongated slots 35 in the retainer plate 28. In this connection, it is to be noted that the inner walls of the slots are substantially V-shaped and are fashioned to cooperate with the ends 34 of the rollers to accurately position the actuator ends of the shoes during adjustment of the latter.

It will also be understood from the foregoing that when the brake is applied, the rollers 31 are free to move radially and circumferentially while in contact with the cam and adjacent shoe ends. Inasmuch as the recesses in the actuator ends of the shoes are provided with a radius corresponding to the radius of the rollers, it not only follows that the wiping action of the cam on the rollers is converted to a substantial linear movement of the actuator ends of the shoes into engagement with the drum, but that the friction is reduced to a minimum and upsetting of the relatively soft ends of the shoes is prevented.

From Figure 1 of the drawings, it will be noted that the location of the cam 22 between the upper ends of the brake shoes is such that rocking movement of the cam in a direction to expand the shoes into engagement with the drum, moves the actuator end of the primary shoe 14 outwardly into engagement with the brake flange and lifts or shifts the secondary shoe 15 in a direction toward the adjustment device to engage the anchor end of this shoe with the brake flange and thereby to effect wrapping of the secondary shoe into engagement in the direction of rotation of the drum. With this method of application, the effectiveness of the secondary shoe is appreciably increased and considerably greater braking torque results.

In the embodiment of the invention, shown in Figures 1 to 4, inclusive, the cam 22 is rocked from a position exteriorly of the drum by means of a lever 36 pivotally supported on the bracket 27 for rocking movement about an axis perpendicular to the axis of rocking movement of the shaft 25 and having a portion 37 intermediate the ends thereof engageable with the free end of an arm 38 fixed on the rear end of the rockshaft 25 by means of the pin 39. Thus, it will be noted that outward swinging movement of the lever 36 about its axis engages the portion 37 of the lever with the free end of the arm 38, and through the latter, rocks the shaft 25 in a direction to expand the shoes into engagement with the brake flange by the cam 22.

In Figures 5 and 6 of the drawings, I have shown a modified form of cam actuating means, particularly designed for use in association with brakes applied to dirigible vehicle wheels. Upon reference to Figure 5, it will be noted that a bracket 40 is mounted for oscillation about the axis of the king pin 41 of the steering knuckle, and is provided with a lateral extension 42 secured to one end of a lever 43 for oscillation by the latter. In detail, the bracket 40 is formed with a coaxially extending upwardly projecting portion 44 adapted to form an abutment for the free end of the rock arm 38' secured to the cam shaft 25' in the manner hereinbefore described. In addition, the bracket 40 is formed with a depending shaft 45 journalled in the king pin 41 for rocking movement on the axis of the latter and having a polygonally shaped portion 46 spaced above the upper end of the king pin. The polygonally shaped portion 46 engages within a correspondingly shaped opening in a cam disc 47 having circumferentially spaced depending cam portions 48 in the form of teeth adapted to mesh with, or engage corresponding cam portions 49 extending upwardly from the upper end of the king pin 41. The arrangement is such that rocking movement of the extension 44 of the bracket by the lever 43 effects a corresponding rocking movement of the cam disc 47 relative to the upper end of the king pin 41 and thereby serves to raise the bracket 40 along the axis of the king pin. Inasmuch as the upper extremity of the extension 44 engages the free end of the rock arm 38', it necessarily follows that raising of the bracket 40 effects a rocking movement of the shaft 25' and cam 22' in a direction to expand the brake shoes into engagement with the brake flange of the drum, in the same manner as described in connection with the first form of this invention. Also, in view of the fact that the upper end of the extension 44 engages the free end of the rock arm 38' on the axis of the king pin, it follows that this engagement is maintained irrespective of the degree of swivel movement of the brake relative to the bracket 40.

Referring again to Figure 5 of the drawings, it will be noted that the cooperating cam means and anti-friction bearing 59 for the king pin are concealed by a cover 51. The cover 51 is apertured at the upper end thereof for receiving the polygonal portion 46 of the bracket, and is enlarged slightly at the lower end thereof to slidably engage the periphery of the bearing cage. The construction is such that the cover 51 moves axially of the king pin with the bracket 40 and serves to protect the bearing, as well as the cam portions from foreign matter.

What I claim as my invention is:

1. In a brake mechanism, the combination with a brake drum, a backing plate, brake friction means within the drum and having spaced ends, of a rockshaft supported on said backing plate for rocking movement about an axis extending substantially parallel to the axis of the drum and having an enlarged head at one end extending into the drum between the spaced ends of the friction means, a cam member located in a recess extending transversely of the head and having the opposite ends extending beyond the sides of the head for engagement with the spaced ends of the friction means, a lever pivotally supported on the backing plate exteriorly of the drum for swinging movement about an axis substantially perpendicular to the axis of the rockshaft, and means on the rockshaft engageable with the lever intermediate the ends thereof for rocking said shaft upon swinging movement of the lever in one direction.

2. In a brake mechanism, the combination with a brake drum, a backing plate, brake friction means within the drum and having spaced ends, of a rockshaft supported on said backing plate for rocking movement about an axis extending substantially parallel to the axis of the drum and having one end extending into the drum between the spaced ends of the friction means, a cam member carried by the end aforesaid of a rockshaft and having the opposite ends engageable with the ends aforesaid of the friction means, a lever pivotally supported upon the backing plate exteriorly of the drum for rocking movement about an axis extending substantially perpendicular to the axis of the rockshaft, and an arm secured to the rockshaft and having one end extending in the path of swinging movement of the lever and engageable with a portion of the lever intermediate the ends of the latter upon swinging movement of said lever in one direction.

3. In a brake mechanism, the combination with a brake drum, a backing plate, brake friction means within the drum and having spaced ends, of a rockshaft supported on said backing plate for rocking movement about an axis extending substantially parallel to the axis of the drum and having one end extending into the drum between the spaced ends of the friction means, a cam member carried by the end aforesaid of the rockshaft and having the opposite ends engageable with the ends aforesaid of the friction means, means for rocking said shaft, and means rockably supporting the end aforesaid of the rockshaft on the backing plate and engageable with diametrically opposed portions of the said end of the shaft between the ends of the cam member to limit the extent of rocking movement of said member by the shaft.

4. In a brake mechanism, the combination with a brake drum, a backing plate, brake friction means within the drum and having spaced ends, of a bracket member secured to the backing plate exteriorly of the drum, a rockshaft journalled in the bracket member and having one end extending through the backing plate into the drum between the spaced ends of the friction means, a cam member carried by the said end of the rockshaft and having the opposite ends engageable with the spaced ends of the friction means, a lever pivotally supported on the bracket member for swinging movement about an axis substantially perpendicular to the axis of rocking movement of said shaft, and means on said shaft engageable with the lever upon swinging movement of the latter in one direction to effect a rocking movement of the shaft.

5. In a brake mechanism, the combination with a brake drum, a backing plate, brake friction means within the drum and having spaced ends, of a bracket secured to the backing plate exteriorly of the drum, a rockshaft journalled in said bracket and having a head at one end extending through the backing plate into the drum between the spaced ends of the friction means, cam means carried by the head and extending beyond the opposite sides of the head for engagement with the spaced ends of the friction means, and axial projections on the bracket extending through the backing plate and engageable with side portions of the head between the ends of the cam means for engagement thereby to limit the extent of rocking movement of said means by the rockshaft.

6. In brake mechanism, a brake drum, brake friction means within the drum having spaced ends, a cam supported for rocking movement between said ends, and rollers supported between the cam and ends aforesaid of the friction means and disconnectedly engaging the cam and extremities of said ends of the friction means, the ends of the friction means provided with arcuate recesses having a radius approximating the radius of the rollers and engageable therewith for actuation thereby upon rocking movement of the cam in one direction.

7. In brake mechanism, a brake drum, a backing plate for the drum, brake friction means within said drum and having spaced ends, a plate secured to the backing plate opposite said ends in axial spaced relation to the backing plate and having slots therethrough, said slots being spaced from each other in a general circumferential direction and having the adjacent walls thereof substantially V-shaped, a cam rockably supported between said plates and between said ends of the friction means, rollers located between the cam and said ends of the friction means for actuating the latter upon rocking movement of the cam in one direction, said rollers having end portions extending into said slots and engageable with the V-shaped walls of the latter to predeterminedly position the friction means when the brake is released.

8. In brake mechanism, a brake drum, a backing for the drum, brake friction means within said drum and having spaced ends, a plate secured to the backing opposite said ends in axial spaced relation to the backing, a cam rockably supported between said plates and between said ends of the friction means, and members located between the cam and said ends of the friction means and disconnectedly engaging the cam and said ends of the friction means for actuating the latter upon rocking movement of the cam in one direction, said members having axial projections extending through slots in said plate elongated in a direction to permit shifting movement of the members circumferentially of the drum.

9. In brake mechanism, a brake drum, brake friction means within the drum having spaced ends provided with arcuate recesses, a cam supported for rocking movement between said ends, and means for actuating the brake friction means upon rocking movement of the cam in one direction including rollers supported between the cam and ends of the friction means and disconnectedly engaging the cam and the walls of the arcuate recesses in said ends of the friction means.

FRANK L. MAIN.